Nov. 8, 1949     N. SCHEFFER     2,487,733
CLICK MECHANISM
Filed Aug. 10, 1948
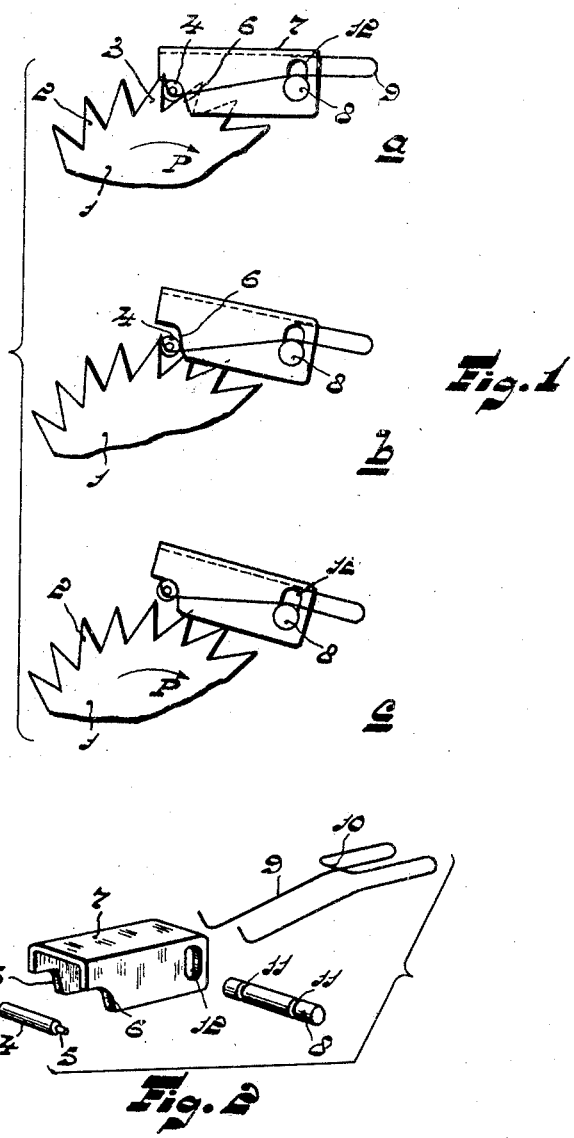
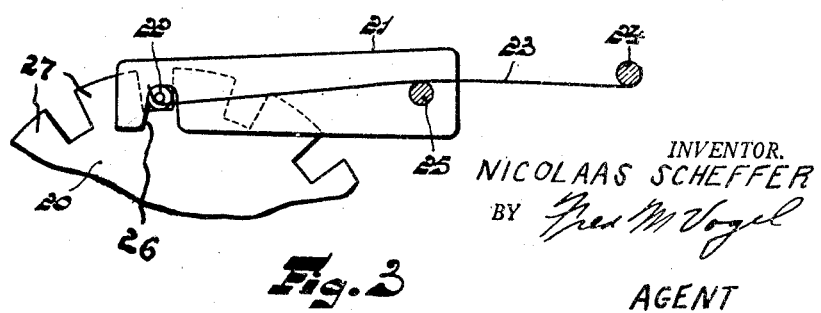
INVENTOR.
NICOLAAS SCHEFFER
BY Fred M Vogel
AGENT Patented Nov. 8, 1949

2,487,733

UNITED STATES PATENT OFFICE 2,487,733

CLICK MECHANISM

Nicolaas Scheffer, Eindhoven, Netherlands, assignor to Hartford National Bank and Trust Company, Hartford, Conn., as trustee Application August 10, 1948, Serial No. 43,360
In the Netherlands September 13, 1947

6 Claims. (Cl. 74—527)

The invention relates to a click or pawl mechanism. More particularly, the invention relates to a click or pawl device, which by movement thereof into a path of a salient portion of the movable member associated therewith, the movement of said member is stopped, at least in one direction, relatively to the click.

Click or pawl mechanisms of this kind are frequently used when a rotary shaft is required to be adapted to be stopped in given positions. For example, said mechanisms may be used with line selectors for automatic telephony, or when a shaft is required to be prevented from rotating back, for example, with so-called overload couplings.

With known click mechanisms, the edge of the salient portion thereof, upon blocking of the movable member, is forced against a face or edge of the salient portion of the movable member. While the pawl is being withdrawn from engagement with the pawl member, which ejection may be effected for example by electro-magnetic means, the friction between the click and the engaging salient part of the movable member entails considerable increase in the force and energy required for this purpose.

The invention has for its object to provide a click mechanism of the said kind in which this disadvantage is obviated and further advantages are obtained.

According to the invention, the pawl or click comprises a pawl-arm and a roller supported thereby which stops the movement of the movable member and which rolls over the pawl arm when the click is being moved out of the path of the movable member. Sliding between parts of the pawl and the movable member during ejection of the pawl is thus avoided. Frictional losses are reduced to the extreme minimum owing to the fact that only rolling friction occurs in this case. Ejection of the pawl requires only a small lifting force and a small amount of energy which is moreover substantially independent of the force exercised on the pawl by the movable member and of whether an accurately smooth finish has been given to the engaging parts or not.

In a favourable embodiment of the device according to the invention the roller, after having rolled over the pawl arm, is returned to its original position relatively to the pawl arm. This may be effected, for example, due to the fact that upon the falling of the pawl into gear for recurrent stopping of the movable member, an edge of the latter forces the roller back before the roller stops its movement entirely. It is, however, more efficient to return the roller immediately upon ejection of the pawl, for example by means of a spring which also urges the roller against its track. As an alternative, a magnetic force may be used for this purpose.

In order that the invention may be more clearly understood and readily carried into effect it will now be described more fully with reference to the accompanying drawing, in which Fig. 1 shows one embodiment of the pawl mechanism according to the invention in three positions a, b, and c; namely, before, during and after ejection of the pawl respectively.

Fig. 2 is a perspective view of the dissembled pawl as used in the mechanism of Fig. 1, and Fig. 3 shows a further embodiment of the pawl mechanism according to the invention.

Referring to Figs. 1a, 1b and 1c, 1 designates a portion of a ratchet wheel which is secured to a spindle (not shown) and the edge of which comprises teeth 2. In the position shown in Fig. 1a rotary movement of the ratchet wheel 1 in the direction P is prevented in that the steep flange of the tooth 3 is forced against the central part of a cylindrical roller 4. The roller 4 bears on either side of this central part thereof on the two L-shaped edges 6 of the walls of the trough of U-shaped section which is formed by the pawl arm 7. To explain this more fully Fig. 2 is a perspective view of the dissembled pawl, corresponding parts of this figure and Fig. 1 being designated by like reference numerals. The pawl arm 7 is adapted to rotate on a spindle 8, which is taken through apertures 12 provided in the walls of the pawl arm. Provision is also made of a spring 9 which is constituted by a resilient wire that has been bent-over several times. The spring 9 is bent in such manner that its central part 10 (Fig. 2) is urged, within the trough formed by the pawl arm 7, against the bottom thereof. The two ends of the spring pass outside, each along a lateral wall of the pawl arm, whilst at the same time they each bear on the spindle 8. These ends are sharply bent over at the extreme points and thus keep the roller 4 in engagement with the edges 6 of the pawl arm, due to the fact that the said ends bear on the ends 5 of the roller ends which project from the lateral walls of the pawl arm and have a smaller diameter than the associated parts of the roller.

By rotation of the pawl arm about the shaft 8 from the position shown in Fig. 1a to that shown in 1b, movement of the ratchet wheel 1 is permitted. During this rotation of the pawl arm the roller 4, as shown in Fig. 1b, rolls both over the steep flank of the tooth 3 of the ratchet wheel and over the edges 6 of the pawl arm 7, both of which are about normal to the original direction of movement of the ratchet wheel. Upon continued movement of the pawl arm, the roller 4 rolls entirely out of engagement with the tooth 3 so that the ratchet wheel 1 is no longer hampered in its movement in the direction of the arrow P and the bent-over ends of the spring 9 which were supplementary tensioned by the movement of the roller 4 over the edges 6, are then permitted to return the roller 4 to its original position, in which it rested in the elbow of the edges 6. In Fig. 1c the roller and the pawl arm are shown in the positions which they occupy after withdrawal of the pawl.

Upon movement of the pawl arm and thus of the roller 4 from this position of Fig. 1c, to the toothed edge of the ratchet wheel, the movement of the ratchet wheel is blocked by engagement of one of the teeth 2 with the roller 4 and the mechanism regains the position shown in Fig. 1a.

Since the ends 5 of the roller 4 have a smaller diameter than the associated parts of the roller, the latter is prevented from falling laterally out of the arm upon withdrawal of the pawl.

It is obvious that upon the pawl falling out of gear with the ratchet wheel 1 by rotation of the pawl arm out of the blocking position, the friction between ratchet wheel and roller and between roller arm and pawl arm is a minimum since there is concerned therewith only the question of the roller 4 rolling over a ratchet wheel tooth 2 and the pawl arm surfaces 6. The energy required for lifting the pawl is found to increase very slowly as the pressure exerted by the ratchet wheel 1 on the pawl is increased. Instead of being cylindrical, the roller 4 may be such that the diameter of the parts that engage with the pawl arm differs from the diameter of that part of the roller 4 which rolls over the tooth-flank 2 so that during withdrawal of the pawl, the extent to which the roller 4 is displaced over the pawl arm surface 6 also differs from the extent of its displacement over the tooth flank 2.

A feature of the device shown in Figs. 1 and 2 is that the spindle holes 12 for the spindle 8 provided in the pawl arm 7 are slot-like, and, at the area engaged by the pawl arm, the spindle 8 comprises two annular grooves 11 in which fit the edges of the spindle-holes 12. This permits readily dissembling of the entire pawl mechanism. The spindle 8 and the pawl arm 7 remain in cooperative engagement with each other due to the fact that the spring 9 urges the edges of the spindle-hole 12 into the grooves 11.

In the pawl mechanism shown in Fig. 3, each lateral wall of a trough-like pawl arm 21, which is rotatable about a spindle 25, comprises a U-shaped recess 26 in which the roller 22 is engaged. In the position shown, the central part of the roller 22 is engaged between right-angled teeth 27 of a ratchet wheel 20 (partially shown) which is adapted to rotate about a shaft (not shown) at right angles with the plane of the drawing. The movement of the ratchet wheel 20 is stopped in either direction of rotation due to the fact that the roller 22 is forced by a ratchet wheel tooth 27 against one or the other wall of the U-shaped recesses 25. Obviously, such blocking of the ratchet wheel may only be effective in both directions when both flanks of the teeth 27 of the ratchet wheel 20 are steep enough to prevent the roller 22 from being ejected from between the teeth by the pressure of the ratchet wheel alone. The central part of the spring 23 (the ends of which, similar to those of the spring 9 of the pawl mechanism shown in Figs. 1 and 2, pass on either side along the pawl arm and after withdrawal of the pawl return the roller to its original position), is held by a stud 24 which is rigidly connected to that part of the pawl mechanism by which the spindle 25 is supported. The attachment of the spring 23 outside the pawl 21 results in the spring 23 assisting in withdrawing the pawl, in contradistinction to the embodiment shown in Figs. 1 and 2 in which the spring 9 is stretched during withdrawal of the pawl.

What I claim is:

1. A pawl device comprising a pawl arm and a roller, means movably mounting said roller on said pawl arm in rolling engagement with a first surface means thereon, a second surface means on said pawl arm at an angle to said first surface and continuous therewith, said movably mounting means comprising a resilient element mounted on said pawl arm and engaging said roller for biasing said roller into said rolling engagement with said first surface means and into engagement with said second surface means.

2. A pawl device as claimed in claim 1 wherein said pawl arm comprises a pair of parallel walls on which said surface means are located.

3. A pawl device as claimed in claim 1 wherein said pawl arm comprises a trough of U-shaped section and said surfaces are formed by notches in the arms of said U-shaped pawl arm.

4. A pawl device comprising a pawl arm and a roller, means movably mounting said roller on said pawl arm in rolling engagement with a first surface means thereon, a second surface means on said pawl arm at an angle to said first surface and adjacent thereto, said movably mounting means comprising a resilient element mounted on said pawl arm and engaging said roller for biasing said roller into said rolling engagement with said first surface means and into engagement with said second surface, said pawl arm comprising a trough of U-shaped section, said surface means being formed by notches in the arms of said U-shaped pawl arm, said roller having a predetermined diameter in the region thereof positioned between said arms and a reduced diameter at the ends thereof which abut said surface means and extend therebeyond, said resilient element comprising a bent section of wire which engages said reduced diameter ends of said roller.

5. A click mechanism comprising a pawl device and a movable member, said pawl device having a movably mounted pawl arm and a roller, means movably mounting said roller on said pawl arm in rolling engagement with a first surface thereon, a second surface on said pawl at an angle to said first surface and continuous therewith, said movably mounting means comprising resilient means mounted on said pawl arm and engaging said roller for biasing said roller into said rolling engagement with said first surface and into engagement with said second surface, said movable member having a part thereof engageable by said roller for stopping movement of said movable member when said pawl arm is moved towards said movable member, whereby during movement of said pawl arm away from said movable member for disengagement of said roller from said part, said roller rolls between said first surface and said part away from said second surface, and on complete disengagement of said roller with said part, said roller is permitted to be moved into engagement with said second surface.

6. A click mechanism comprising a pawl device and a movable member, said pawl device having a movably mounted pawl arm and a roller, means on which said pawl arm is pivotally mounted, means movably mounting said roller on said pawl arm in rolling engagement with a first surface thereof, a second surface on said pawl at an angle to said first surface and continuous therewith, said movably mounting means comprising resilient means supported by said pawl arm and engaging said roller for biasing said roller into said rolling engagement with said first surface and into engagement with said second surface, said movable member having a part thereof engageable by said roller for stopping movement of said movable member when said pawl arm is moved towards said movable member, said resilient means being rigidly secured to said pawl arm pivotally mounting means, whereby during pivotal movement of said pawl arm away from said movable member for disengagement of said roller from said part, said roller rolls between said first surface and said part away from said second surface, and on complete disengagement of said roller with said part, said roller is permitted to be moved into engagement with said second surface.

NICOLAAS SCHEFFER.

REFERENCES CITED

The following references are of record in the file of this patent:

UNITED STATES PATENTS

| Number | Name | Date |
|---|---|---|
| 1,386,382 | Thompson | Aug. 2, 1921 |